United States Patent
Freeny, III

(10) Patent No.: US 8,538,818 B2
(45) Date of Patent: Sep. 17, 2013

(54) INTEGRATED COMPUTER AND STORE TRANSACTION SYSTEM (ICASTS)

(75) Inventor: Charles C. Freeny, III, Flower Mound, TX (US)

(73) Assignee: Automated Business Companies, Spring, TX (US)

( * ) Notice: Subject to any disclaimer, the term of this patent is extended or adjusted under 35 U.S.C. 154(b) by 1960 days.

(21) Appl. No.: 10/674,782

(22) Filed: Sep. 30, 2003

(65) Prior Publication Data

US 2004/0064372 A1   Apr. 1, 2004

Related U.S. Application Data

(60) Provisional application No. 60/415,259, filed on Sep. 30, 2002.

(51) Int. Cl.
*G06Q 20/00* (2012.01)

(52) U.S. Cl.
USPC ............................................. 705/16; 705/17

(58) Field of Classification Search
USPC .......................................................... 705/17
See application file for complete search history.

(56) References Cited

U.S. PATENT DOCUMENTS

| | | | | |
|---|---|---|---|---|
| 5,305,390 | A * | 4/1994 | Frey et al. | 382/115 |
| 5,924,077 | A * | 7/1999 | Beach et al. | 705/7.29 |
| 6,091,777 | A | 7/2000 | Guetz et al. | |
| 6,223,215 | B1 * | 4/2001 | Hunt et al. | 709/217 |
| 7,240,027 | B2 * | 7/2007 | McConnell et al. | 705/28 |
| 2002/0143934 | A1 * | 10/2002 | Barker et al. | 709/224 |

* cited by examiner

*Primary Examiner* — Paul Danneman
(74) *Attorney, Agent, or Firm* — Dunlap Codding, P.C.

(57) ABSTRACT

A store transaction system that can determine what a store should be making each day if all the customer transactions were entered into the stores point of sale computer. The store transaction system combines various sensor outputs activated by customer activity in a logical manner to develop an independent store monitor that can operate 24/7 to reduce employee theft. A preferred embodiment compares the store transaction system revenue with the store point of sale computer system operated by the employees so an owner can determine a shift or the employees that are involved with theft without having to manually view video surveillance information or hire extra managers to watch the store operations. The invention also allows remote reviewing of those that are having exceptional positive impact on store sales. Another preferred embodiment allows an owner to remotely operate their integrated computer and store transaction system from any Internet access device with the proper browser.

7 Claims, 1 Drawing Sheet

INTEGRATED COMPUTER AND STORE TRANSACTION SYSTEM (ICASTS)

CROSS-REFERENCE TO RELATED APPLICATIONS

The present patent application claims priority under 35 U.S.C. §119 to the provisional patent application identified by U.S. Ser. No. 60/415,259, filed on Sep. 30, 2002, the entire content of which is hereby incorporated herein by reference.

STATEMENT REGARDING FEDERALLY SPONSORED RESEARCH OR DEVELOPMENT

Not Applicable.

BACKGROUND OF INVENTION

Today, most stores selling goods or services have both a computer transaction system to record sales activity when employees are present and a store security system to watch the store when employees are not present. Often the computer system is a Point Of Sale (POS) hardware and software system provided to the owner of a franchise such as a McDonalds, Wendy's, Great Clips, Pro Cuts, Texaco, Exxon, Pep Boys, Auto Zone, Jiffy Lube, etc., by the franchiser and is designed to provide the owner with customer and sales information as input by the employees into the POS computer system.

Store security systems are provided by a number of vendors such as ADT and Smith Alarm and are primarily designed to store activity and after hours and thwart attempted burglaries. Since the advent of the video camera, a video camera connected to other sensors such as motion, or door and window, or cash drawer sensors are the primary elements of store security systems.

More recently, video surveillance systems have been employed to help owners catch employee theft. It is well known in all the various industry sectors (especially service industries) that employee theft is the greatest operating loss facing owners due to the discrepancy between the actual customer store transaction versus the data entered (or not entered) into the store POS computer system. The video surveillance systems in recent years have provided more information to help curb this loss, but it still requires a lot of time and effort by the owner to try and correlate information from a store surveillance system depicting customer store activity, for example, with the store POS computer system operated by the employee. Such correlation must show that an employee serviced a customer without inputting the transaction into the store computer system and kept the revenue or input an incorrect amount in order to manipulate the reported amount.

Large corporations such as Dillard's, Macy's, Neiman Marcus, Wal-Mart, Target and many others, including casinos, have developed extensive security monitoring systems to help catch employee theft, but these are primarily systems requiring management personnel and strict employee money handling policies implemented to quickly catch unsophisticated employee theft through a series of daily checks and balances but not through any fully automated system.

Store and business computer systems are well known in the art and recently companies such as BEA, Peoplesoft, IBM, Siebel, Microsoft, Oracle and many others have developed specialized business programs accessible from the Web but not store computer systems where the owner can operate the store computer program from remote locations and none of them have developed store transaction system. Programs such as PC anywhere or services such as www.gotomypc.com can be used to operate a computer remotely but a "disconnected" system that behind the scenes goes and operates the store computer to input changes made by store owners are not available.

The Franchise companies are taking the lead in developing Internet sites where a store owner can view their operational data such as at www.salondata.com but do not offer the ability to operate the store computer system in a connected or disconnected manner from a website.

A typical state of the art web accessible store or home security surveillance system can be seen at www.adt.com. However, store surveillance systems fall way short of the complicated customer activity determination required by a store transaction system and, a store transaction system as described herein has not been developed in the industry until now. Furthermore the integration of a store point of sale computer system with a store transaction system such as described in this invention is not even being discussed in the current business trade journals as a solution to the employee revenue theft problem and the system described herein offers a way for technology to greatly lower employee theft in a cost effective manner.

Problems to be Solved

A primary problem to be solved is that of first providing a store "transaction system" that can be installed in a store to automatically provide information regarding what revenue the store "should" be making if all of the customers being serviced are entered into the stores point of sale "computer system" properly. Such a system will be sensitive to the type of store business (e.g. type service, type product, store and facility layout, etc.) and complicity of the transaction pricing system (e.g. product store may have several thousand possible transaction prices whereas a service store may only have 5 to 20).

Consequently the transaction system for one type store may vary considerable in the way it computes revenue versus a transaction system from that of another type store. However the basic architecture will be virtually the same with the main difference being in the transaction system revenue computational programs of the various type stores.

A second primary problem to be solved is that of combining a store transaction system with a store point of sale computer system in such a manner that the difference between the revenues from these two systems can be determined automatically and when possible associate the difference with the employees responsible for these discrepancies. When possible the solution to this problem should be done completely automatically and the results accessible by the owner from any web access device.

It will be assumed through out these descriptions that the store transaction system captures all of the "actual" revenue transactions each day so that any discrepancy is because one or more employees does not enter into the store point of sale computer, revenue they received from a customer.

Another employee theft problem to be solved, and preferably with the same system, is that of allowing the owner to review and alter the store employee hours accumulated by the store computer from remote locations each day so the employee computer work hours can be maintained in accordance with the actual worked hours as seen by the store transaction system or other employee time control system.

SUMMARY OF THE INVENTION

The current invention disclosed and claimed herein relates to a store transaction system that determines automatically the revenue the store should be making based on the transactions being observed by the system. Several preferred embodiments for different type businesses are described and a more detailed description is provided for a Hair Salon business.

The current invention disclosed and claimed herein also relates to an "Integrated Computer And Store Transaction System" (ICASTS) that compares information accumulated in a store point of sale computer system as input by the store employee and corresponding information accumulated in a store transaction system and notes any differences automatically. In a preferred embodiment information from both computer systems are accumulated at a third party Website and the comparisons are made available to the owner or operator in several ways so as to gain quick insight into when and what employees are involved in causing discrepancies. A preferred embodiment to build the ICASTS utilizes the "Split Personal Computer System" described in U.S. Pat. Nos. 6,243,743 and 6,350,253 developed by Freeny et al at www.mosspc.com along with the "Master Operating Software System" and "Low Entropy Terminal User System" of Pending applications disclosed in U.S. Ser. No. 09/697,557 respectively to provide an easy to use Internet computer available anytime anywhere from virtually any Internet device available to the owner.

The simple Internet Computer solution allows an owner to completely control their stores from anywhere in the world and forbid access to most store information by the store employees. The invention described herein allows stores (or store departments) providing both service and product to have two integrated computer systems one automatically computing transaction revenue plus one computing point of sale revenue and comparing the two revenues.

The various inventions described herein solve the problems listed above.

DETAILED DESCRIPTION OF THE INVENTION

Figure 1:
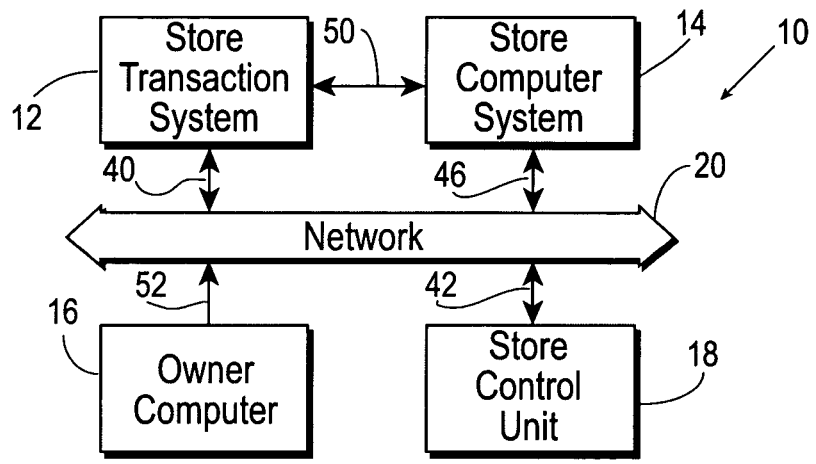
FIG. 1 is a block diagram of an integrated computer and store transaction system constructed in accordance with the present invention.

Referring now to the drawings and in particular to FIG. 1, shown therein and designated by a reference numeral 10 is an integrated computer and store transaction system constructed in accordance with the present invention. The system 10 includes a store transaction system 12, a store computer system 14 (or point of sale system 14), an owner computer 16 and a store control unit 18. Each of the store transaction system 12, the store computer system 14, the owner computer 16 and the store control unit 18 typically communicate with each other via a network 20. The network 20 can be a wide area network or a local area network. In general, The system 10 is designed to monitor activity associated with one or more stores and determine an automated tracking signal indicative of a predetermined activity to be automatically monitored. In one preferred embodiment, the activity to be monitored is customer activity, and the automated tracking signal is indicative of expected revenue based on the customer activity.

The store control unit 18 receives the automated tracking signal and also receives a baseline comparison signal. The store control unit 18 compares the automated tracking signal with the baseline comparison signal so that an owner can be notified of any discrepancy or difference between the automated tracking signal and the baseline comparison signal.

In one preferred embodiment, the automated tracking signal is indicative of expected revenue and the baseline comparison signal is actual revenue received from the store computer system 14. In this embodiment, the expected revenue is compared with actual revenue so that an owner can determine if any employee theft, bad salesmanship or other problem is occurring. The store control unit 18 outputs an alert signal upon determination of a difference exceeding a predetermined level between the automated tracking signal and the baseline comparison signal.

The term "store" as used herein refers to a location where one or more good and/or service is provided to a customer. The term store can also refer to a department within a store. Common examples of a store is fast food delivery stores, such as McDonalds and Wendy's, a hair salon, such as Great Clips, or Pro Cuts, a gas station, such as Texaco, or Exxon, automobile service stations, such as Pep Boys, or Jiffy Lube, or automobile parts store, such as Auto Zone.

The store transaction system 12 includes one or more sensor 24 (FIG. 2) associated with a store. The sensor 24 receives information indicative of activity, such as customer activity and automatically outputs activity signals via a signal path 26. The activity signals can be customer activity signals indicative of customer activity sensed by the sensor 24. The store transaction system 12 also includes an activity computer 30 and a transaction computer 32. The activity computer 30 collects the activity signals and sends information indicative of such activity signals to the transaction computer 32 for automated tracking determination. The transaction computer 32 automatically receives the activity signals and automatically generates an automated tracking signal, such as an expected revenue signal indicative of expected revenue, to be received by the store based on the activity.

The transaction computer 32 outputs the automated tracking signal, such as the expected revenue signal, via a signal path 40 to the store control unit 18 via a signal path 40, the network 20 and the signal path 42. The store computer system 14 generates or has stored therein baseline comparison signals or information. In one preferred embodiment, the baseline comparison signals can be actual revenue signals based on actual revenue derived from transactions actually entered into the store computer system 14. The store computer system 14 outputs the baseline comparison signals, such as the actual revenue signals to the store control unit 18 via a signal path 46, the network 20 and the signal path 42.

The store control unit 42 receives the automated tracking signals and the baseline comparison signals. The store control unit 42 compares the automated tracking signal with the baseline comparison signal. In one preferred embodiment, if a large discrepancy exists between the automated tracking signal and the baseline comparison signal, the store control unit 18 outputs an alert signal. As will be understood by one skilled in the art, the amount of the discrepancy can be tailored based on many factors, such as the expected accuracy of the automated tracking signal, the comfort level of the owner, or the like. In one preferred embodiment, the store control unit 18 is established as a website communicating with the Internet.

The store or department in a multiple department store 5 will generally have the store computer system 14 generally referred to as a "Point Of Sale" (POS) system operated by the store employees. The POS 14 is designed to record all of the store customer sales noted by customers, for example. The customer sales can be for services or store products which are not shown separately.

Typical employee theft occurs when a customer pays an employee for either a product or service and the employee either fails to enter the transaction into the store computer system 14 or enters an incorrect or lesser amount than paid by the customer. In the case of thefts involving products most store computer system 14 track inventory and physical counts versus POS counts and can detect when these numbers are different. However for service businesses such as a hair salon or an automobile oil change service theft is hard to detect without some means of watching all store customer transactions.

The store transaction system 12 has a means to detect each store customer and their corresponding transactions independent of the store POS system 14 operated by the store employees. Store computer systems 14 are well known in the art and will not be described herein other than noting the type of information normally accumulated in the store computer system 14. The store transaction system is primarily designed to provide an independent assessment of what revenue the store should be collecting based on the customer and their activity. Note that although the store computer system 14 and the store transaction system 12 are shown separately for purposes of clarity they may in fact share the same physical housing and computer hardware.

In order that both the store computer system 14 and the store transaction system 12 have identical information regarding the store employees and store products or services a connection 50 serves to allow the store transaction system 12 and the store computer system 14 to share such information. The network 20 which can be a WAN or LAN including the Internet connects the various elements together and allows the owner or manager of the store to observe activity in both the store computer system 14 and the store transaction system 12 via an owner computer 16. The owner computer 16 communicates with the store transaction system 12, the store computer system 14, or the store control unit 18 via a signal path 52 and the network 20.

One preferred embodiment automatically compares the store activity, such as revenue, using the store control unit 18 such as a website or local client server which are well known in the art. The owner can utilize the owner computer 16 to access the store control unit 18 to observe any differences in actual and expected store revenue. Preferred embodiments provide various ways to compare the activity being accumulated in the store computer system 14 and the store transaction system 12 such as by employee, by shift, by product or service and many others.

Figure 2:
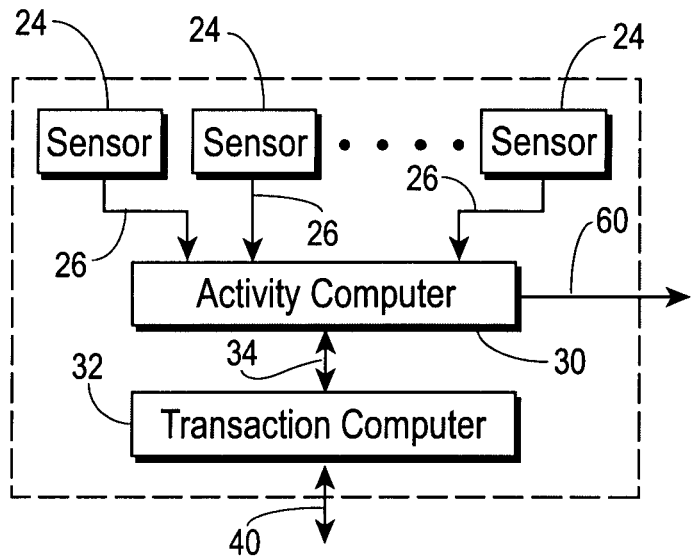
FIG. 2 is a block diagram of a store transaction system constructed in accordance with the present invention.

In FIG. 2 the basic elements of the store transaction system 12 are shown and include the transaction computer 32 connected to the store computer system 14 via the signal path 40 to receive employee and product and service transaction data (automated tracking signals) for use in determining each of the various transactions such as expected revenue, or other activity signals that owners might deem important to want to have automated tracking such as employee time, customer service treatment (i.e. length of time, proper greetings), or other store policies.

The invention will be described hereinafter with reference to the determination of expected revenue based on customer activity signals. However, it should be understood that the present invention is equally applicable to determining other types of automated tracking signals.

The transaction computer 32 receives data from the activity computer 30 via the signal path 34. The activity computer 30 receives information from the sensors 24 such as video cameras, sound detectors or other sensors such as motion, proximity, and many others well known in the art of surveillance via line the signal paths 26. In one preferred embodiment, each of the sensors 24 observe each customer and employee. It should be understood that activity, such as customer and/or employee activity does not have to be at a physical location, the activity can be call in, website or any other method of receiving activity, such as customer and/or employee activity. The information observed from activity is collected in the activity computer 30 and sent to the transaction computer 32 via signal path 34 for automated tracking determination.

For example the transaction computer 32 might determine each store customer for one set of data and use an average store sales price to determine how much revenue the store should be collecting. There are many ways to determine the store activity depending on the type of store and a specific method is described below for a hair salon. The more information supplied by the activity computer 30 the more precise the transaction computer 32 can determine the store transaction for each customer and employee. Note that although the transaction computer 32 and the activity computer 30 are shown separately they may share the same housing and computer hardware.

The activity computer 30 may also serve as the store security system and security signals from the activity computer 30 are sent directly to the store security monitor service (not shown) via signal path 60.

Figure 3:
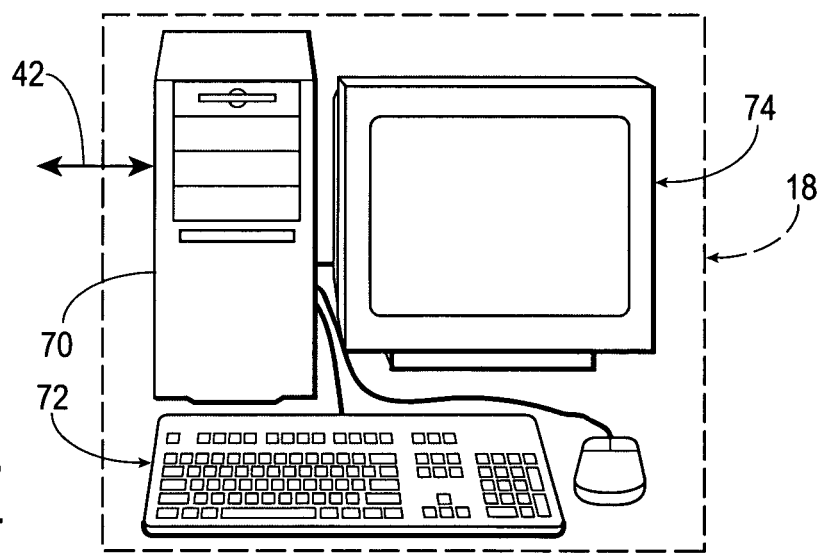
FIG. 3 is a pictorial representation of a remote store control system constructed in accordance with the present invention.

The basic elements of the Store Control Unit 18 is shown in FIG. 3 and includes a computer 70 connected to the other store elements via the network 20 and the signal path 42. The computer 70 has both input units 72, such as a keyboard and a mouse and outputs units 74. A preferred embodiment of the store control unit 18 and/or the owner computer 16 is such that a third party website maintains the computer 70 and the input unit(s) 72 and the output unit(s) 74 are located with or at the store for easy access from any location at any time. Such a system and design are described in U.S. Pat. Nos. 6,343,743 and 6,350,253. Also it should be mentioned that the store control unit 18, the store transaction system 12 and the store computer system 14 may in fact share the same housing and computer hardware depending on the particular system desired by the store owner. Further, the owner computer 16 and the store control unit 18 can be located at a store or a department within a store, or maintained as a web site.

One embodiment of the system 10 for a hair salon will be described hereinafter. The sensors 24 can be included in a combination of salon cameras with audio and salon sensors located for example at the salon door, stylist chairs, and POS cash register (not shown but well known to those in the surveillance business). For example, one or more of the sensors 24 can be a pressure sensor or photosensor placed in or on the stylist's chair to determine when a person is sitting in the chair. A transaction is determined for each customer from the sensors 24 along with salon product and service data sent to the store transaction system 12. The salon product and service data can be correlated with each salon stylist or employee if desired.

The store activity information such as revenue and customer count as determined by the store transaction system 12 is sent from the store transaction system 12 to the store control unit 18, which is implemented as a store website. The store activity information can be transmitted via a predetermined polling or data uploading program stored in either the store control unit 18 or the store transaction system 12.

For example store revenue can be computed by using a standard average sale value for each customer serviced or using a value based on the type service being provided by the stylist in each case. Depending on the sophistication of the store transaction system 12, additional activity information such as, time each employee worked, number of time each stylist greets customer according to store policy, plus employee selling activity, and time to service a customer can be recorded. That is, additional information that can be used for employee performance appraisals can also be obtained from the store transaction system 12. In essence the store transaction system 12 can be made just as effective or more effective as having a store manager actively watching every employee servicing every customer. During the same time period the hair salon store computer system 14 records customer sale transactions based on the hair stylist inputs transactions. The store computer system 14 also computes other hair salon information such as time to cut each customer, number of customers per stylist, product sales and time the employee is clocked in to work based on the employee inputs to the store computer system 14. The store activity information such as revenue and customer count as determined by the store computer system 14 is sent from the store computer system 14 to the store control unit 18, which is established as a website according to a predetermined polling or data uploading program.

The store control unit 18 compares the store activity information sent by both the store transaction system 12 and the store computer system 14 and makes available the differences between the data along with the data from each system. The owner computer 16 can access the store activity information from any Internet access device with a proper browser such as Netscape 6.0 or IE 6.0.

The store control unit 18 for the hair salon can be used to determine many types of store activity comparisons such as plotting differences in the two activity systems based on: a) store employee shifts; b) days of the week; c) hours of the day; and many more. Such differences can be used to quickly focus in on camera data for example that also can be made available from the store control unit 18 to observe employees during periods the automated system suggest a large discrepancy between store transaction system 12 activity and store POS computer activity. In addition, in a preferred embodiment using the Split PC system described in U.S. Pat. No. 6,343,743, for example, the owner computer 16 can alter the employee time worked data entered into store POS computer 430 using their access device along with other data the store transaction system 12 suggests should be corrected.

The elements and system to produce an automated store transaction system 12 capturing the store activity independently of the activity as input by employees into the store point of sale computer system 14 and the integrated computer and store transaction system 10 that compares two relative independent automated store or service activity system in order to determine employee theft has been described using specific type stores and services stores. Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A method for monitoring store transactions, comprising the steps of:
   providing at least a first sensor and a second sensor associated with a physical store, the first sensor sensing information indicative of customer activity of at least one customer and automatically outputting first activity signals indicative of such customer activity sensed by the first sensor, the second sensor sensing information indicative of employee activity of at least one employee and automatically outputting second activity signals indicative of such employee activity sensed by the second sensor;
   receiving the customer activity signals and the employee activity signals automatically via a transaction computer and automatically generating an expected revenue signal indicative of expected revenue to be received by the physical store based upon at least one of the customer activity of the at least one customer and the employee activity of the at least one employee;
   generating an actual revenue signal indicative of actual revenue received from the at least one customer by the physical store, and comparing the actual revenue signal with the expected revenue signal; and
   outputting, automatically an alert signal when a discrepancy is found between the actual revenue signal and the expected revenue signal.

2. The method of claim 1, further comprising a store control unit receiving the expected revenue signal and also receiving a baseline comparison signal, the store control unit comparing the expected revenue signal with the baseline comparison signal.

3. The method of claim 2, wherein the store control unit is established as a website communicating with the Internet.

4. The method of claim 2, wherein the store control unit outputs an alert signal upon determination of a difference exceeding a predetermined level between the expected revenue signal and the baseline comparison signal.

5. An integrated store and transaction computer system monitoring store transactions, the system comprising:
   at least a first sensor and a second sensor associated with a physical store, the first sensor sensing information indicative of customer activity of at least one customer and automatically outputting first activity signals indicative of such customer activity sensed by the first sensor, the second sensor sensing information indicative of employee activity of at least one employee and automatically outputting second activity signals indicative of such employee activity sensed by the second sensor;
   at least one transaction computer receiving the first and second activity signals from the first and second sensors, the transaction computer automatically generating an expected revenue signal indicative of expected revenue to be received by the physical store based on at least one of the customer activity of the at least one customer and the employee activity of the at least one employee;
   at least one store computer system receiving information indicative of a purchase by the at least one customer, the purchase correlating to at least one of the sensed customer activity and the sensed employee activity, the store computer system outputting a baseline comparison signal indicative of actual revenue generated from the purchase correlating to the customer activity; and
   a store control unit receiving and comparing the baseline signal and the expected revenue signal, the store control unit generating an output indicative of results of the comparison, wherein the store control unit outputs an alert signal upon determination of a difference exceeding a predetermined amount between the baseline signal and expected revenue signal.

6. The system of claim 5, wherein the transaction computer, the store computer and the store control unit are integrated as one computer system.

7. The system of claim 5, wherein the store control unit is established as a website communicating with the Internet.

* * * * *

UNITED STATES PATENT AND TRADEMARK OFFICE
CERTIFICATE OF CORRECTION

Page 1 of 1

PATENT NO. : 8,538,818 B2
APPLICATION NO. : 10/674782
DATED : September 17, 2013
INVENTOR(S) : Charles C. Freeny, Jr.

It is certified that error appears in the above-identified patent and that said Letters Patent is hereby corrected as shown below:

On the Title Page

Under (75) Inventor: Delete "Charles C. Freeny, III, Flower Mound, TX (US)" and replace with
-- Charles C. Freeny, Jr., (US) --

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,538,818 B2  
APPLICATION NO. : 10/674782  
DATED : September 17, 2013  
INVENTOR(S) : Charles C. Freeny, Jr.

Page 1 of 1

It is certified that error appears in the above-identified patent and that said Letters Patent is hereby corrected as shown below:

On the Title Page

Item (12), delete "Freeny, III" and insert -- Freeny, Jr. --.

Under (75) Inventor: delete "Charles C. Freeny, III, Flower Mound, TX (US)" and replace with -- Charles C. Freeny, Jr., (US) --.

This certificate supersedes the Certificate of Correction issued April 1, 2014.

Signed and Sealed this
Twenty-second Day of April, 2014

Michelle K. Lee
*Deputy Director of the United States Patent and Trademark Office*